3,088,854
Patented May 7, 1963

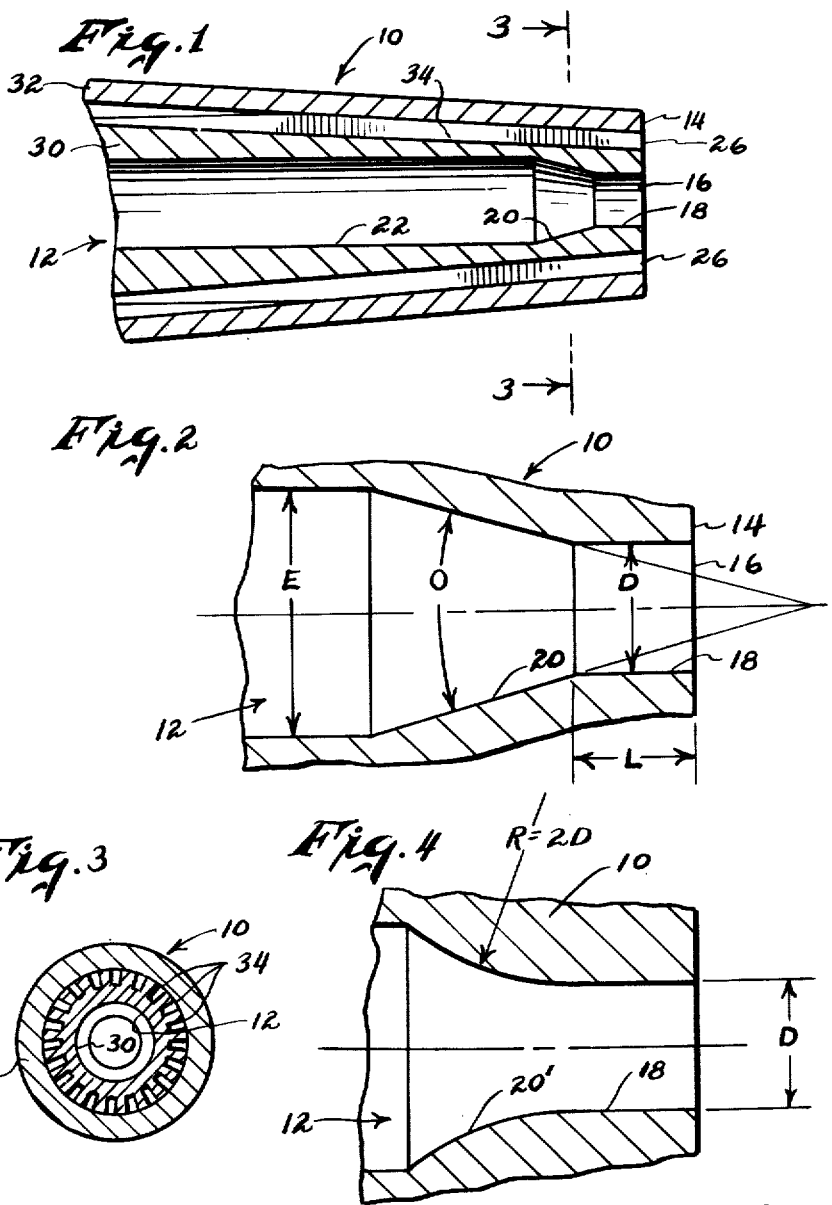

3,088,854
METHODS AND APPARATUS FOR CUTTING
George R. Spies, Jr., Murray Hill, N.J., assignor to Air Reduction Company, Incorporated, New York, N.Y., a corporation of New York
Filed Nov. 8, 1960, Ser. No. 67,992
17 Claims. (Cl. 148—9)

This invention relates to cutting and is more particularly concerned with the cutting of metals, as ferrous metals, by means of oxygen cutting jets.

One of the limitations or disadvantages in cutting, as oxygen cutting of metals, has been the difficulty of maintaining the side walls of the cut smooth, and the kerf narrow, especially in the case of cutting thick sections. The cutting, generally, of any workpiece of about six inches or more in thickness may be considered "heavy cutting." While workpieces of substantial thickness are cut successfully, it is necessary to use oxygen jets of substantial diameter, with the resulting consumption of large quantities of the gas.

The prior art procedures and apparatus in these cutting operations have not satisfactorily overcome the problems encountered in designing the proper cutting apparatus, to give the desired cut, in terms of desirable gas flow rates, flow velocities, and pressures. Further, these problems appear to be due primarily to the characteristics of the oxygen jet issuing from the torch; and further as the operating pressures increase, the problem of maintaining desirable oxygen jet characteristics becomes more difficult and acute. The effect of these torch design problems has been that the prior workers in this field have been generally required to use trial-and-error methods to obtain suitable cutting tips, and the tips have not had a discipline of the oxygen stream comparable to that obtained with this invention.

It is, therefore, an object of this invention to provide improved cutting methods and apparatus.

Another object of this invention is to provide improved methods and apparatus for easier starting of cuts and improved cutting results by use of an oxygen jet.

A further object of the invention is to provide an improved gas flow passage for producing desired characteristics in the gas issuing from said passage.

It is a further object of the invention to provide an improved gas flow passage for cutting tip orifice for oxygen that produces an oxygen jet that is useful in improved methods of cutting.

A specific object of this invention is to provide an improved oxygen cutting tip, which when used in heavy metal cutting, gives improved results.

A further object of the invention is to provide oxygen cutting methods and apparatus whereby a narrow kerf with smooth side walls is obtained in metal cutting.

These and other objects and advantages of this invention will be described in greater detail or will become apparent from the following description.

In accordance with the present invention, there is produced by the cutting procedures a narrow kerf with substantially smooth side walls. This result is obtained with a smaller jet, by constricting the oxygen flow as it approaches the workpiece and confining the gas stream to a uniform cross section for only a short run before releasing the stream from any mechanical confinement at a region adjacent to the surface of the workpiece to be cut. The important consideration is that the confinement beyond the constricting flow region must be short in proportion to the width of the stream. The improved results obtained by the use of this invention are explained or described in the following discussion, but such explanations or descriptions are not intended to limit or bind the invention to particular theories of operation. In general, cutting tips of the prior art, where there has been flow constriction followed by flow restraint to uniform cross section, the stream has been confined to a cross section for too long a distance or time to obtain or yield the improved results of this invention. Because of the factors affecting gas flow at high velocity, and the resulting complications due to their interaction upon one another, it is difficult to utilize the prior art methods and apparatus to solve the problems or difficulties associated with these flow conditions.

As previously indicated in cutting a particular thickness of a metal, as steel, a certain amount of oxygen is required. This oxygen is supplied at proper conditions through a cutting tip to give the desired combination of the amount of gas flow and gas velocity. The gas pressures required to produce these gas flow characteristics are maintained as long as the gas is confined within the flow passage or cutting tip. By the time the gas reaches the discharge or cutting orifice, this gas pressure should be converted to velocity in order to prevent an uncontrolled pressure release that causes general disturbance or conformational changes in the flowing stream or discharging jet. This pressure release at discharge also results in variations in the cut surface, and often in poor quality cuts.

It is another object of this invention to provide improved apparatus for carrying out the methods of this invention. This apparatus includes a tip or flow passage having an oxygen passage with portions of uniform diameter joined by a smoothly curved or tapered, stream-constricting, portion which extends between a larger diameter portion of the oxygen passage and a smaller diameter, stream-confining, portion of the oxygen passage from which the oxygen is discharged through an orifice in the end face of the tip. The length of the smaller diameter portion of the oxygen passage is short, and when compared with the orifice diameter it is generally of the magnitude of about one diameter or less. Preferably the stream-restricting tapered portion is so provided as to minimize the disturbance imparted to the constricted stream.

The tip of this invention also includes other passages for suppling gas to flame jet orifices in the end face of the tip and preferably in a circle around the oxygen cutting-jet orifice.

Other objects, features, and advantages of the invention will appear or be pointed out as the description proceeds.

In the drawing, forming a part hereof, in which like reference characters indicate corresponding parts in all the views:

FIGURE 1 is a longitudinal sectional view through the end portion of a cutting tip made in accordance with this invention;

FIGURE 2 is a diagrammatic sectional view through a portion of a cutting tip showing an oxygen passage having the features of this invention;

FIGURE 3 is a cross-sectional view taken on the line 3—3 of FIGURE 1; and

FIGURE 4 is a view similar to FIGURE 2 but showing a modified form of the invention.

FIGURES 1 and 2 show a cutting tip 10 having a passage 12 for cutting oxygen. This passage opens through an end face 14 of the cutting tip to form an oxygen jet orifice 16. The seat end of the tip is not shown in the drawing but may be of any of the conventional forms of construction well known to those skilled in the art, having suitable provision for retention in a cutting torch and delivery of cutting oxygen and preheat gases to the corresponding tip passages hereinafter described. Illustrative of a cutting tip having one suitable form of seating means, for example, is the tip shown and described in the U.S. Patents Nos. 2,881,826 and 2,468,824.

An end portion 18 of the passage 12 nearest to the discharge orifice 16 is of substantially uniform diameter and of the same diameter as the orifice 16. This diameter is indicated by the dimension legend "D." At the end of the passage 12 there is another portion 20 where the passage converges toward the passage 18 and the discharge end of the tip. In FIGURES 1 and 2, the converging portion 20 has a taper with an included angle of between about 25° to 30° and this angle is indicated by the arrows and reference character "O." Wider and narrower angles within the range between 5° to 60°, but with some sacrifice in results, may be used; however, the extreme limits of acceptable results are between 1° and 120°.

It is preferred that the cutting tip be made so that the converging portion of the oxygen passage 12 is curved substantially as shown at 20' in FIGURE 4. In combination with the other distinguishing features of the present construction, such curvature of the constricting portion of the passage evidences a beneficial effect upon the nature and quality of the cutting oxygen jet as manifested in an over-all further improvement of the desired cutting characteristics of the tip. In such embodiment, the over-all angle of convergence of the curved constricting portion as measured between the starting point and the point at which the curved portion is smoothly merged into the discharge passage 18 is preferably within the range hereinabove described in connection with the conical converging section shown in FIGURE 2. However, the curvature of the portion 20' need not be constant along its length. Generally, it has been found advantageous to provide the curving portion in any smooth curve such that the passage progressively diminishes in cross section along its length and meets the terminal passage 18 substantially tangentially and wherein the radius of curvature of any portion thereof is not less than about ¼ of the diameter of the end passage 18 corresponding to the dimension "D." Preferably, the radius of curvature of any portion 20' is at least about twice the dimension "D." Alternatively the converging portion of the oxygen passage 12 may comprise an initial curved section as already described merging into a tapered section such as in FIGURES 1 and 2.

The length of the end portion 18 in FIG. 2 is indicated by the dimensional reference "L," and the diameter of the end portion 18 by the reference "D," the corresponding length "L" in FIGURE 4 being measured substantially from the point of intersection of the curved portion 20' with the straight bore passage 18. "L" should be not greater than about the diameter "D." End portion lengths "L" equal to "D" have been found highly advantageous although lengths corresponding to D/2 and D/4 have been found satisfactory, and the length of "L" can be made even shorter. The desired value on the short side depends upon the convergence of the portion 20 or 20'. If the angle of convergence of the portion 20 or 20' is reduced, then "L" can be made less without losing the beneficial characteristics of the cutting jet.

The passage 12 has another portion 22 which is of substantially uniform cross section and from which the converging portion 20 extends with progressively decreasing cross section. For any selected tip it is desirable to make the diameter of the portion 22, indicated by the dimensional reference "E," as large as possible, although excessively large values of the dimension "E" are disadvantageous, because of the increased size of the cutting tip and lack of space for the preheat flow passages. In practice, advantageous results and convenience of construction are obtained with the ratio E/D within the range of about 1.25 to 4.17. The maximum practical ratio E/D appears to be about 10. The length of the portion 22 of the passage having the diameter "E" seems to be unimportant provided it is at least long enough that the exit orifice is substantially unaffected by transient effects of the gas stream at the seat end.

As the oxygen flows through the passage 12 from the portion 22 of the passage and through the converging stream-restricting portion 20, the oxygen stream decreases in cross section and increases in velocity. There is further pressure drop in the end, flow-confining portion 18, but by having this end portion short, the pressure drop is reduced. Thus, the required supply pressure for a given delivery rate is lower with tips according to the present invention than with other cutting tips.

The new results obtained include the easier starting of cuts, particularly in heavy cutting of metal workpieces of 8 inches thickness and up. Even with a bad start where the jet does not fully penetrate the workpiece, the lower part of the jet trails without losing the cut and then penetrates fully and catches up to produce a normal kerf. The invention obtains smoother cuts and narrow kerfs, and the cutting of thicker sections for a given size of jet orifice. The smoother cuts and narrow kerfs are particularly marked when doing heavy cutting; and because of the smaller jets which can be used, the economy of heavy cutting is increased, since the consumption of oxygen is substantially reduced. Accordingly, the advantages of the present invention are particularly marked in connection with tip cutting oxygen orifices above about 0.09 inch diameter corresponding to the heavier cutting operations with the working gas pressures and flow rates used.

FIGURE 1 shows the full section of the cutting tip 10. There are a plurality of preheating flame jet orifices 26 opening through the end face 14 of the tip at angularly-spaced regions around the center oxygen jet 16. These flame jet orifices 26 are preferably located around a circle concentric with the longitudinal axis of the cutting jet passage.

The cross sections of the oxygen passage 12 are preferably circular at all locations, but the preheating jet orifices 26 are of rectangular cross section in the construction illustrated. This results from the method by which the tip 18 is manufactured. It is of composite construction with a center core 30 surrounded by a sleeve 32. The flame jet orifices are formed by cutting grooves 34 in the peripheral surface of the core 30. The sleeve 32 fits over the upper ends of these grooves 34 to form a plurality of separate passages for the preheating gases.

Usually the grooves 34 extend for only a portion of the length of the tip and open into an annular clearance between the center core 30 and the sleeve 32. The supplying of preheating gases to this annular clearance may be through metering ports extending through an upper part of the tip where the sleeve 32 is connected to the center core 30. The particular construction for providing preheating jet orifices is not important to this invention, and the construction illustrated is merely illustrative. As previously mentioned, the larger diameter portion 22 of the oxygen passage is such as to provide ample room beyond the oxygen passage, in a radial direction, for preheating gas passages without unduly increasing the overall size of the tip 10.

It will be understood that the tip can be provided with circular flame jet orifices in place of the orifices 26, and with any conventional arrangement of flame jet orifices with respect to the oxygen cutting jet orifice 16, although those constructions that furnish the preheat passages within a minimum radial segment of the tip and permit larger practical approach bore sizes for the oxygen passage in a given size of tip are highly desirable.

Comparison of this invention with high quality cutting tips of the prior art shows that with cuts made on workpieces of the same thickness and at the same speeds, the tips of this invention make the cuts with from 10% to 20% less oxygen.

The preferred embodiment of the invention has been illustrated and described, but changes and modifications can be made and some features can be used in different combinations without departing from the invention as defined in the claims.

What is claimed is:

1. The method of cutting which comprises maintaining a cutting gas flow in a flow passage, constricting said gas flow, confining said constricted gas flow, and continuing said confining of the gas flow for a short distance, and at the end of said short distance discharging the gas into the atmosphere.

2. The method of cutting which comprises maintaining a cutting gas flow in a flow passage directed to a workpiece to be cut, constricting said gas flow and discharging said constricted flow toward said workpiece through a discharge orifice formed by a cylindrical passage wherein the constricted gas stream is confined for a distance not more than about the length of the diameter of said orifice, and the confining of the gas is continued until said gas is discharged into the atmosphere adjacent to the work piece.

3. The method of cutting with gas which comprises supplying a cutting gas to a confined passage of generally circular cross section, constricting the gas stream at a rate equivalent of between about 1° to 120° of included angle, confining the gas stream beyond the constriction, maintaining the confined gas stream after constriction at a uniform diameter for a short distance, and discharging the gas stream from the passage and into the atmosphere at the end of said short distance.

4. The method of cutting with a cutting oxygen stream which comprises supplying and maintaining a stream of cutting oxygen under pressure to a cutting tip having a confined flow passage, constricting the oxygen stream at a rate equivalent to a taper of between about 5° to 60° of included angle, confining the oxygen stream to a uniform diameter beyond the range of constriction, and releasing the oxygen stream from any restraint above the surface to be cut and before the oxygen stream has travelled beyond the range of constriction for a short distance not greater than about the diameter of the stream.

5. The method of cutting with a jet of oxygen discharged from a cutting tip which comprises supplying a stream of cutting oxygen under pressure to the cutting tip, constricting the stream at a rate equivalent to a taper of between about 25 to 30 degrees of included angle, confining the stream beyond the region of constriction, and releasing the oxygen stream from any mechanical restraint immediately above a kerf of a cut and before the stream has travelled beyond the region of constriction for a distance as great as the diameter of the stream.

6. In the cutting of a workpiece by means of an oxygen jet, the improvement which comprises constricting cutting oxygen stream as it approaches the workpiece, and mechanically confining the stream to a uniform diameter equal to the final constricted diameter and immediately beyond the region of constriction, and then discharging the stream into the atmosphere as a cutting jet before it has travelled beyond the constriction region for a distance as great as the final constricted diameter of the stream.

7. The method descirbed in claim 6 and in which the jet is discharged adjacent to high-temperature flame jets and into a kerf in a workpiece of more than six inches in thickness.

8. A cutting tip comprising a flow passage, a portion of the cutting oxygen flow passage being of substantially uniform diameter, said flow passage decreasing in diameter from said uniform diameter portion to another flow passage portion of uniform diameter and that opens through a face of the tip, said second flow passage of uniform diameter having a length not greater than its diameter.

9. A cutting tip comprising cutting oxygen flow passage portions adjacent to the cutting tip orifice, a first flow passage portion of substantially uniform diameter and connected to a second flow passage portion, said second passage portion having an initial diameter equivalent to said first flow passage portion and in which the diameter decreases continuously to a value of the diameter of a third flow passage portion, said third flow portion having a length within a range between about one-fourth of its diameter and its full diameter, and said third flow portion terminating at an orifice in a face of the tip.

10. An oxygen cutting tip having a cutting oxygen passage which comprises first, second, and third flow passage portions, the latter terminating at a cutting tip discharge orifice, said first flow portion being of substantially uniform diameter and of a diameter greater than that of said third flow portion, said second flow portion having an initial diameter equivalent to that of said first flow portion and the diameter of the second flow portion decreasing continuously in a direction along its longitudinal axis to a final value equivalent to the diameter of said third portion, and said third portion having a substantially uniform diameter and a length less than about one-half to one times its diameter.

11. An oxygen cutting tip having an end face, a cutting oxygen passage leading through the tip and having a discharge outlet opening through the end face, the passage being of substantially uniform diameter back from the end face to a location spaced from the end face by a distance less than the diameter of the discharge outlet, said passage having a portion of increasing cross section from said location to a region further back from the tip face where the passage is again of uniform cross section and of substantially larger diameter than the discharge outlet.

12. The oxygen cutting tip described in claim 11 and in which the oxygen passage changes in diameter at a rate equivalent to an included angle of between approximately 25° and 30°, and the ratio of the larger diameter portion of the passage to the discharge outlet is between 1.25 and 4.17.

13. The oxygen cutting tip described in claim 11 and in which the ratio of the larger diameter portion of the passage to the discharge outlet is between 1.25 and 4.17, and there are other passages in the tip for preheating gases, the other passages being at angularly-spaced locations around the oxygen passage and opening through the end face in a circle of flame jet orifices.

14. In an oxygen cutting tip in which a central cutting oxygen passage extends through the tip to a jet orifice opening through an end face of the tip, and there are a plurality of smaller passages for preheating gas at angularly-spaced regions around the central passage and terminating in jet orifices opening through the face of the tip in a circle around the oxygen jet orifice, the improvement which comprises a cutting oxygen passage having a portion of its length of a uniform cross section, equal to that of the jet orifice and extending back from the jet orifice for a distance less than the width of said jet orifice, and having another portion of the length of said oxygen passage which is of uniform diameter and which serves as an approach passage and an intermediate portion of said oxygen passage joining the first portion to the approach passage, said intermediate portion having a cross section that varies progressively from that of the approach passage to that of the first portion.

15. The oxygen cutting tip described in claim 14 and in which the length of the end portion of the cutting oxygen passage is approximately equal to the width of said jet orifice.

16. The oxygen cutting tip described in claim 14 and in which the change in cross section of a portion of the cutting oxygen passage is along a curve that is substantially tangent to the wall of the end portion of the cutting oxygen passage at the juncture of said end portion with the portion of the passage having the change of cross section.

17. The oxygen cutting tip described in claim 15 and in which the tapered portion of the cutting oxygen passage includes an angle of between 5° and 60°, and there is a portion of the cutting oxygen passage leading to the tapered portion and of substantially uniform cross section and of a width between 1.25 and 4.17 times as great as the width of said jet orifice.

References Cited in the file of this patent

UNITED STATES PATENTS

| | | |
|---|---|---|
| 2,192,661 | Jones | May 19, 1940 |
| 2,210,403 | Skinner | Aug. 6, 1940 |
| 2,491,024 | Babcock | Dec. 13, 1949 |
| 2,521,199 | Babcock | Sept. 5, 1950 |
| 2,881,826 | Spies | Apr. 14, 1959 |
| 2,897,884 | Fee | Aug. 4, 1959 |

FOREIGN PATENTS

| | | |
|---|---|---|
| 358,925 | Germany | Sept. 16, 1922 |

UNITED STATES PATENT OFFICE
CERTIFICATE OF CORRECTION

Patent No. 3,088,854　　　　　　　　　　　　　　　May 7, 1963

George R. Spies, Jr.

It is hereby certified that error appears in the above numbered patent requiring correction and that the said Letters Patent should read as corrected below.

Column 1, line 45, for "for cutting" read -- or cutting --; column 5, line 64, strike out "cutting oxygen" and insert the same in line 63, before "flow" same column 5.

Signed and sealed this 31st day of December 1963.

(SEAL)
Attest:
ERNEST W. SWIDER

Attesting Officer

EDWIN L. REYNOLDS

Commissioner of Patents